United States Patent [19]

Jones et al.

[11] Patent Number: 4,459,352

[45] Date of Patent: Jul. 10, 1984

[54] CONDUCTIVE COATING COMPOSITION AND COMPOSITE BASES AND ELEMENTS CONTAINING SAME

[75] Inventors: Raymond T. Jones, Webster; James E. Kelly, Rochester; Karen L. Mott, Webster, all of N.Y.

[73] Assignee: Eastman Kodak Company, Rochester, N.Y.

[21] Appl. No.: 453,049

[22] Filed: Dec. 27, 1982

[51] Int. Cl.³ .......................... G03C 1/78; G03C 1/84
[52] U.S. Cl. .................................. 430/539; 430/533; 430/535; 428/535; 428/536
[58] Field of Search ................... 430/62, 63, 4, 7, 208, 430/286, 527; 428/535, 536

[56] References Cited

U.S. PATENT DOCUMENTS

| | | |
|---|---|---|
| 1,981,425 | 11/1934 | McNally . |
| 2,093,464 | 9/1937 | Malm et al. . |
| 2,127,573 | 8/1938 | Sheppard et al. . |
| 2,127,621 | 8/1938 | Staud et al. . |
| 2,146,755 | 2/1939 | McNally et al. . |
| 2,326,056 | 8/1943 | Nadeau et al. . |
| 2,346,078 | 4/1944 | Nadeau et al. . |
| 2,856,399 | 10/1958 | Mench et al. . |
| 3,201,251 | 8/1965 | Nadeau et al. . |
| 4,123,278 | 10/1978 | Van Paesschen et al. . |
| 4,209,584 | 6/1980 | Joseph .................... 430/527 |

*Primary Examiner*—John E. Kittle
*Assistant Examiner*—John L. Goodrow
*Attorney, Agent, or Firm*—Alfred P. Lorenzo

[57] ABSTRACT

An aqueous coating composition comprises (a) a hydrophilic binder; (b) an ester of cellulose having at least 8 acyl groups per $C_{24}$ cellulose unit wherein at least a majority of the acyl groups are derived from an aliphatic polycarboxylic acid having from 3 to 6 carbon atoms; or a salt of the ester; and (c) a hardening agent in an amount sufficient to render the composition water-insoluble after coating and drying of the composition. This coating composition is useful for forming water-insoluble, conductive and highly-adherent layers in composite bases or elements, and particularly in photographic elements having hydrophobic supports. The conductive layers can be used, for example, as conducive subbing layers or conductive pelloid layers.

32 Claims, No Drawings

CONDUCTIVE COATING COMPOSITION AND COMPOSITE BASES AND ELEMENTS CONTAINING SAME

FIELD OF THE INVENTION

This invention relates to coating compositions useful for providing water-insoluble, conductive, and highly-adherent layers on composite bases or elements. In particular, such compositions are useful for providing conductive subbing layers for adhering hydrophilic layers (e.g. photographic emulsion layers) to hydrophobic supports (e.g. polyester films). It also relates to composite bases and elements containing one or more layers formed from such coating compositions.

BACKGROUND OF THE INVENTION

Hydrophobic substrates, such as polyester, polyamide or polystyrene film bases and resin-coated paper supports, are well known commercial materials which possess a number of advantages for many uses. In the photographic industry, for example, such substrates are used as supports for various radiation-sensitive elements. However, the use of such hydrophobic materials in the photographic and other arts has been hampered to some extent because of the difficulty of suitably adhering various other layers to them, particularly when such other layers are hydrophilic in nature.

In order to improve the adhesion of various layers to hydrophobic supports, it is known to apply one or more intermediate layers to the supports before other layers are applied as described, for example, in U.S. Pat. No. 4,123,278 (issued Oct. 31, 1978 to Van Paesschen et al). Such intermediate layers are generally known as "subbing" layers and can include a wide variety of natural or synthetic resinous materials, adhesion promotors and the like.

During the manufacture of radiation-sensitive elements, but prior to applying radiation-sensitive or other hydrophilic layers to a subbed hydrophobic support, the support web itself is subjected to considerable mechanical handling over rollers and other web-guiding means. As a result, a considerable buildup in electrostatic charge occurs on the support web. Because of the insulative nature of the support material, little of this charge is dissipated by the time it reaches subsequent coating operations. Consequently, such electrostatic charge often interferes with coating operations and causes nonuniformities, streaks and other defects in the applied coatings. Further, during the coating of radiation-sensitive materials, the electrostatic charge often arcs or discharges thereby "fogging" the radiation-sensitive layers. Fogging shows up as small white dots in any image provided in such layers.

Attempts have been made to prevent or reduce electrostatic charge buildup either by making the support conductive or by coating the support with conductive compositions as noted, for example, in U.S. Pat. No. 1,981,425 (issued Nov. 20, 1934 to McNally) and in the Van Paesschen et al patent mentioned hereinabove.

However, such attempts have had limited success. While reducing electrostatic charge buildup to some extent, known conductive layers generally exhibit limited conductivity thereby reducing such buildup to an insufficient degree. Other conductive layers exhibit inadequate adhesion to hydrophobic supports. In particular, it has been difficult for workers in the photographic art to find coating compositions which, when coated and dried, will prevent or reduce electrostatic charge buildup. It has also been difficult to find coating compositions for use in forming conductive layers which readily adhere to hydrophobic supports.

Hence, there is a need in the art for a coating composition which is useful for providing conductive and highly-adherent layers on hydrophobic support materials.

SUMMARY OF THE INVENTION

The present invention relates to a novel aqueous coating composition which, when coated onto a support and dried, overcomes all of the aforementioned problems encountered with known conductive coating compositions. Most notably, this novel coating composition can be used to provide a conductive layer which effectively reduces or eliminates electrostatic charge buildup which often occurs during manufacturing operations. Further, this subbing layer exhibits excellent adhesion to both hydrophobic support materials and subsequently coated hydrophilic layers. The coating compositions of this invention are also useful for providing water-insoluble and conductive pelloid layers on hydrophobic support materials. Pelloid layers are also known as anti-curl layers.

In accordance with this invention, an aqueous coating composition, which is capable of forming a water-insoluble conductive and highly-adherent layer on a support, comprises (a) a hydrophilic binder; (b) an ester of cellulose having at least 8 acyl groups per $C_{24}$ cellulose unit wherein at least a majority of the acyl groups are derived from an aliphatic polycarboxylic acid having from 3 to 6 carbon atoms; or a salt of that ester; and (c) a hardening agent in an amount sufficient to render the layer water-insoluble after coating and drying of the coating composition.

This invention also provides a composite base comprising a support having on at least one side thereof a water-insoluble, conductive and highly-adherent layer composed of the components (a), (b) and (c) described hereinabove.

Further, this invention provides a composite element comprising a support and on at least one side thereof, a hydrophilic layer. This layer is adhered to the support with a water-insoluble, conductive and highly-adherent subbing layer composed of:

(a) a hydrophilic binder;
(b) an ester of cellulose having at least 8 acyl groups per $C_{24}$ cellulose unit wherein at least a majority of the acyl groups are derived from an aliphatic polycarboxylic acid having from 3 to 6 carbon atoms; or a salt of the ester; and
(c) a hardening agent in an amount sufficient to render the subbing layer water-insoluble after coating and drying.

DETAILED DESCRIPTION OF THE INVENTION

The coating composition of this invention is an aqueous-based composition. Typically, water is the only solvent in the composition. However, mixtures of water and water-miscible organic solvents (e.g. alcohols such as methanol and isopropanol, and ketones such as acetone) can be used as long as water comprises at least 50 percent, by weight, of the mixture.

The first essential component of the coating composition of this invention is one or more hydrophilic binders. Typically, such binders are film-forming and water-soluble. They are either commercially available or readily prepared using methods known to workers skilled in the art. Suitable hydrophilic binders include both naturally occuring substances such as proteins and protein derivatives, cellulose derivatives (e.g. cellulose esters and cellulose nitrate), gelatin and gelatin derivatives, polysaccharides, collagen derivatives; and synthetic hydrophilic polymeric materials such as poly(vinyl alcohol), poly(vinyl acetate)s and the like. Other examples of useful hydrophilic binders are known in the art as described, for example, in *Research Disclosure*, publication 17643, December, 1978, p. 26, paragraph IX (published by Industrial Opportunities, Ltd., Homewell, Havant Hampshire PO9 1EF United Kingdtom). A binder particularly useful in the practice of this invention is gelatin.

The second essential component of the coating compositions of this invention is one or more of certain esters of cellulose, or water-soluble salts of such esters. These esters or salts have at least 8 acyl groups per $C_{24}$ cellulose unit wherein at least a majority of the acyl groups are derived from an aliphatic polycarboxylic acid having from 3 to 6 carbon atoms. The esters useful in the practice of this invention can be represented by the following formula of a $C_{24}$ cellulose unit:

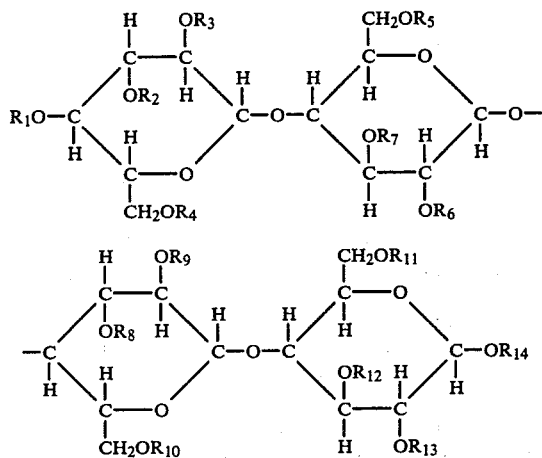

wherein each of $R_1$-$R_{14}$ is independently hydrogen or an acyl group. The term "acyl group" is used in this specification and in the following claims to refer to an organic radical derived from an organic acid by removal of the hydroxyl group (i.e. $R_1CO$— wherein $R_1$ is a hydrocarbon moiety). At least 8, and preferably, at least 10 of $R_1$-$R_{14}$ are acyl groups. Of those acyl groups, at least a majority (i.e. greater than 50 percent), preferably, at least about two-thirds, and most preferably, all of them are derived from one or more suitable aliphatic polycarboxylic acids, which are described in detail hereinbelow.

The esters of cellulose or salts thereof useful in the practice of this invention are either commercially available, or readily prepared by a skilled worker in the art. One method of preparation includes reacting cellulose with one or more organic acids including polycarboxylic acids (or their functional equivalents) having from 3 to 6 carbon atoms in the presence of an organic base, such as pyridine, quinoline or the like. The resulting reaction product is then washed with dilute acid to remove substantially all of the base and to give a polycarboxylic acid ester of cellulose in which each of the acid acyl groups presents at least one free unesterified carboxylic group. To get the corresponding ester salts, the acid ester can be treated with a suitable hydroxide (e.g. ammonium hydroxide or an alkali metal hydroxide).

Useful polycarboxylic acids (or acid halides or anhydride equivalents) for preparing the described esters include both aliphatic saturated and aliphatic unsaturated polycarboxylic acids having at least two carboxyl groups. Preferably, aliphatic saturated acids having only two carboxyl groups (i.e. dicarboxylic acids) are used. Examples of useful polycarboxylic acids include malonic acid, succinic acid, glutaric acid, fumaric acid, glutaconic acid, 2-methylsuccinic acid, adipic acid, 1,2,3-propanetricarboxylic acid, and the like. Preferred acids include dicarboxylic acids having from 3 to 6 carbon atoms, such as succinic acid, malonic acid, and glutaric acid. A particularly useful polycarboxylic acid is succinic acid.

Mixtures of the described esters or salts thereof can be used in the coating compositions of this invention, if desired. Preferably, one or more salts of such esters are used. Such salts include the ammonium or alkali metal (e.g. lithium, sodium, potassium, etc.) salts. The sodium and potassium salts are particularly useful.

The coated conductive layers provided in the film bases and elements of this invention must be rendered water-insoluble. This can be done in either of two ways: (1) by including a suitable hardening agent in the aqueous coating composition itself in an amount sufficient to render the composition water-insoluble after coating and drying of the composition; or (2) by incorporating a suitable diffusible hardening agent which is capable of rendering the composition water-insoluble at any appropriate place in the composite base or element. For example, a diffusible hardening agent can be incorporated in a hydrophilic coating composition which is coated "in association with" the coated conductive layer. As used in this specification and in the claims, "in association with" refers both to layers which are contiguous and to layers which have intervening layers therebetween through which the diffusible hardening agent can diffuse to reach the conductive layer. Preferably, when a diffusible hardening agent is used in the practice of this invention, it is incorporated in a layer contiguous to the conductive layer so that diffusion of the hardening agent is expedited.

In a preferred embodiment of this invention, the hardening agent is included in the aqueous coating composition with the cellulose ester or salt thereof. The hardening agent can also be used to harden the hydrophilic binder in the composition, if necessary, as when gelatin is used as the binder.

Useful hardening agents, both diffusible and nondiffusible are well within the skill of an ordinary worker in the photographic art. Many of them are commercially available. Others can be readily prepared. They can be used alone or in mixtures, and in a free or blocked form.

Useful hardeners include Werner chromium complex compounds, chromium halides and sulfates, aldehydes, epoxy-containing compounds, haloethylsulfonyls, bis(-vinylsulfonyl)s, zirconium nitrate and others described, for example, in *Research Disclosure*, publication 17643, paragraph X, noted hereinabove. Preferred hardeners for use in this invention include diepoxides, such as butanediol diglycidyl ether.

The proportions of the essential components making up the coating compositions of this invention can be varied widely to meet the requirements of conductivity, adhesion and water-insolubility for a given use. Typically, the hydrophilic binder in the aqueous coating composition is present in an amount in the range of from about 20 to about 50, and preferably from about 20 to about 35, percent based on total dry composition weight. Further, the ester of cellulose or salt thereof is generally present in an amount in the range of from about 50 to about 80, and preferably from about 65 to about 80, percent based on total dry composition weight. The hardening agent is typically present in the aqueous coating compositions in an amount in the range of from about 10 to about 30, and preferably from about 15 to about 20, percent based on total dry composition weight. When a diffusible hardening agent is incorporated in another location in the composite base element, additional amounts may be needed so that a sufficient amount diffuses to the coated conductive layer to render it water-insoluble.

The coating compositions of this invention can include additional nonessential ingredients in amounts which are typically used in the art. For example, they can contain matting agents (e.g. silica, starch, titanium dioxide, polymeric beads, zinc oxide and calcium carbonate), coating aids (e.g. alcohols and surfactants), biocides, wetting aids, dyes, defoamers, thickeners, colorants, and other addenda commonly employed in such compositions.

Typically, the percentage solids in the aqueous coating compositions of this invention is in the range of from about 0.5 to about 15 percent based on total wet composition weight depending upon the use of the coating composition. For example, if it is used to provide a conductive subbing layer, the percent solids typically ranges from about 0.5 to about 2.5 percent. If the use intended is as pelloid or backing layer, the percent solids typically ranges from about 5 to about 15 percent.

The coating compositions of this invention can be applied to a suitable support material to form a conductive layer in the preparation of a composite base or composite element. Typical support materials include subbed or unsubbed polymeric films, wood fiber or cellulosic substances (e.g. paper), metallic sheets and foil, glass and ceramic substances. Typical of useful cellulosic supports are paper supports having a baryta or resin (e.g. polyolefinic) coating thereon.

Preferably, the support is a hydrophobic material, such as a resin-coated paper or a polymeric film. By "hydrophobic" is meant that the supports have a high or strong tendency to repel water. This hydrophobicity can be conveniently determined by measuring the receding water contact angle, $\theta_R$, established between a droplet of distilled water and the surface of the support. Methods for determining $\theta_R$ are well known. A suitable method is the Sessile drop method described in *Physical Chemistry of Surfaces* by A. W. Adamson (published by Interscience Publishing Corp., 1967, pp. 352-375). Although it can be lower, typically, the $\theta_R$ for supports used in the practice of this invention, as determined by the Sessile drop method, is greater than about 75°, and preferably greater than about 90°.

Typical useful polymeric film supports include cellulose nitrate; cellulose esters (e.g. cellulose triacetate); polystyrene; polyamides; polymers prepared from vinyl chloride; polyolefins (e.g. polyethylene); polycarbonates; polyacrylates; polysulfones; polyamides and polyesters of dibasic aromatic carboxylic acids with divalent alcohols. A particularly useful polymeric support is a poly(ethylene terephthalate) film.

A more detailed description of useful supports and methods of making same is provided in *Research Disclosure*, publication 17643, paragraph XVII, cited previously herein and the references mentioned therein.

The aqueous coating composition of this invention can be applied to one or both sides of the support, but preferably to only one side, to form an electrically conductive layer. The composition can be applied or located on the supports by any of a number of suitable procedures, including immersion or dip coating, roller coating, reverse roll coating, air knife coating, doctor blade coating, gravure coating, spray coating, extrusion coating, bead coating, stretch-flow coating and curtain coating. The composition can be applied alone or as one of several layers applied with multilayer coating techniques. Applied layers can be dried by any suitable evaporation technique. Descriptions of coating and drying techniques are given in *Research Disclosure*, publication 17643, paragraph XV, cited hereinabove and the references mentioned therein. The thickness of the coated conductive layer will depend upon the particular requirements of the composite base or element involved and is well within the skill of an ordinary worker in the photographic coating art. The conductive layer can be formed with one or more coating passes to obtain desired coverages. Drying of the coated layer(s) can be carried out over a wide range of temperatures as is known in the art.

The coated and dried conductive layer typically has a surface resistivity of less than about $10^9$ ohms per square, and preferably from about $10^7$ to about $10^8$ ohms per square, all measured at 21° C. and 50% relative humidity. This resistivity can be measured by any suitable technique. One such technique is described in ASTM Standard C59.3, designation D257-75 entitled "Standard Methods of Test for D-C Resistance or Conductance of Insulating Materials," pp. 66-85, published Feb. 29, 1975. U.S. Pat. No. 3,525,621 (issued Aug. 25, 1970 to Miller) also discusses measurement of surface resistivities of coated layers.

The composite bases of this invention can be used for any number of products which require a substrate having one or more conductive layers thereon. One such use is for preparing composite elements which additionally carry one or more additional layers which may not adhere adequately to hydrophobic supports. Typically, such additional layers are hydrophilic in nature. By "hydrophilic" is meant that the layers have a strong tendency to attract water. As with the hydrophobic supports described hereinabove, the hydrophilicity of such layers can be determined by measuring the $\theta_R$ by the Sessile drop method.

Typical hydrophilic layers contained in composite elements include subbing layers, antihalation layers, antistatic layers, matting layers, reflective layers, timing layers, neutralizing layers, protective layers and the like as are commonly used in the photographic art. Such hydrophilic layers would also include hydrophilic image-forming and image-bearing layers useful in the printing, electrographic (e.g. electrophotographic), photographic and other imaging arts. The hydrophilic layers typically contain one or more hydrophilic binders (referred to in this specification and in the claims as "second hydrophilic binder") which can be the same or different from what is described in the element claims as the "first" hydrophilic binders used in the aqueous coating compositions of this invention. Preferably, the first and second hydrophilic binders are the same. For example, preferably both are gelatin.

In one embodiment of this invention, the composite elements are useful as image-forming elements which typically comprise one or more image-forming layers containing components capable of providing an image under certain conditions, e.g. in response to electromagnetic radiation, heat, electricity or chemical treatment. Typical image-forming compounds are described, for example, in *Research Disclosure*, publications 10938 (May, 1973); 15162 (November, 1976); 17029 (June, 1978); and 17643 (December, 1978).

In another embodiment of this invention, the composite elements are useful as image-receiving elements which comprise one or more image-receiving layers containing components capable of "receiving" an image. Such elements can be used as receivers in, for example, integral image transfer film units or two-sheet instant film products, including those sometimes called "peel apart" products and those described in U.S. Pat. Nos. 4,296,195 (issued Oct. 20, 1981 to Bishop et al) and 4,297,432 (issued Oct. 27, 1981 to Bowman et al). They can also be photoconductive elements designed to receive toned images.

In a preferred embodiment of this invention, a radiation-sensitive element comprises a suitable support (e.g. a resin-coated paper or polyester film). To this support, one or more radiation-sensitive layers are adhered with a conductive subbing layer composed of the hydrophilic binder, cellulose ester (or salt thereof) and hardener described herein. Preferably, the hardening agent is provided in the aqueous coating composition which is applied and dried, but if diffusible, it can be incorporated in another appropriate place in the element if desired.

Such radiation-sensitive elements include elements intended for use in both black-and-white and color photography, such as photothermographic, photographic, thermographic and radiographic elements, diffusion or image transfer film units and the like. Examples of photographic elements include photographic papers, aerial films, micrographic films and graphic arts films. The characteristics, components and methods of making such elements are known in the art. One reference summarizing much of the art is *Research Disclosure*, publication 17643, cited previously hereinabove.

In another preferred embodiment of this invention, the aqueous coating composition of this invention is coated on a suitable support and dried to be used as a conductive pelloid layer. This pelloid layer could provide both antistatic and anti-curl characteristics to the resulting composite base or element. It is located on the side of the support opposite to that side on which any image-forming or image-receiving layers are applied. Such conductive pelloid layers also typically contain a matting agent, such as silica. Between the pelloid layer and the support can be one or more intervening layers if desired.

The radiation-sensitive layers useful in the practice of this invention can contain any suitable radiation-sensitive material. Preferably, they are photographic emulsion layers which contain one or more of the conventional photographic silver halides. Such materials include, for example, silver chloride, silver bromide, silver bromoiodide, silver chlorobromide, silver chloroiodide, silver chlorobromoiodide, and mixtures thereof.

Typically, these emulsion layers also contain one or more hydrophilic binders. Illustrative examples of such binders are proteins such as gelatin, protein derivatives, cellulose derivatives, polysaccharides such as starch, sugars such as dextran, plant gums, and synthetic polymers such as polyvinyl alcohol, polyacrylamide and polyvinylpyrrolidone. Conventional addenda such as antifoggants, stabilizers, sensitizers, development modifiers, developing agents, hardeners, plasticizers, coating aids, etc. can also be included in the radiation-sensitive layers.

In addition to the conductive and radiation-sensitive layers described hereinabove, the elements of this invention can include other appropriate subbing, pelloid, protective, adhesive, filter, reflective, opacifying, antistatic, intermediate and other layers commonly incorporated in radiation-sensitive products.

The hydrophilic (e.g. radiation-sensitive) layers, and other optional layers, in the elements of this invention can be applied to a support or composite base in any suitable manner, including those well known techniques described hereinabove for applying the aqueous coating compositions of this invention. The hydrophilic layers can be bonded directly to the support with the described conductive layer, or if desired, there can be one or more intervening layers either between the support and the conductive layer, or between the conductive layer and the hydrophilic layer. Preferably, the hydrophilic layer is bonded directly to the support with the conductive layer.

In a particularly preferred embodiment of this invention, a photographic element comprises a polyester support having on at least one side thereof, one or more photosensitive silver halide emulsion layers. These emulsion layers are adhered to the support with a water-insoluble, conductive and highly-adherent subbing layer formed from an aqueous coating composition comprising: gelatin; potassium cellulose succinate; and butanediol diglycidyl ether hardener in an amount sufficient to render said potassium cellulose succinate water-insoluble after coating and drying of the coating composition.

The following examples are provided to illustrate the practice of this invention.

EXAMPLE 1

An aqueous coating composition was prepared having the following components:

|  | Weight percent |
| --- | --- |
| potassium cellulose succinate (containing 10 succinyl groups per $C_{24}$ cellulose unit) | 0.6 |
| gelatin | 0.15 |
| coating aid | 0.01 |
| biocide | 0.02 |
| polymeric bead matte agent | 0.02 |
| butanediol diglycidyl ether hardening agent | 0.15 |
| distilled water | 99.05 |
|  | 100.0 |

This coating composition was coated and dried on a poly(ethylene terephthalate) film support to provide a water-insoluble, conductive and highly-adherent layer in a composite base. The dry coverage was about 0.05–0.1 g solids per square meter of area. The surface resistivity of the conductive layer was measured with the technique described in ASTM Standard C59.3 noted hereinabove. It was found to be about $10^7$ ohms per square at 21° C. and 50% relative humidity. To this composite base over the conductive layer was then applied a silver bromoiodide photographic emulsion to provide a photographic element.

During the preparation of the composite base, it was observed that there was a marked reduction in electrostatic charge buildup compared to that which normally occurs when known subbing compositions are used.

EXAMPLE 2

The following composition was prepared, coated and dried on a poly(ethylene terephthalate) support to provide a water-insoluble, conductive pelloid layer on a composite base:

|  | Weight percent |
| --- | --- |
| potassium cellulose succinate (containing 10 succinyl groups per $C_{24}$ cellulose unit) | 3.3 |
| gelatin | 7.7 |
| silica | 0.07 |
| bis(vinylsulfone)methyl hardening agent | 0.13 |
| distilled water | 88.8 |
|  | 100.0 |

The resulting pelloid layer had a surface resistivity of about $10^8$ ohms per square at 21° C. and 50% relative humidity as measured by the procedure described in Example 3 hereinbelow.

EXAMPLE 3

This is a comparative example of the conductive nature of a coated layer derived from an aqueous coating composition of this invention to the conductive nature of several coatings derived from coating compositions outside the scope of this invention. Controls A-D were like the coating composition described in Example 1 with the only difference being the particular cellulose ester used. Control E was like the composition of Example 1 except that it contained no cellulose ester.

| Control A | potassium cellulose acetate succinate in which about 31% of the acyl groups are succinyl groups |
| --- | --- |
| Control B | potassium cellulose acetate succinate in which about 21% of the acyl groups are succinyl groups |
| Control C | potassium cellulose acetate succinate in which about 13% of the acyl groups are succinyl groups |
| Control D | cellulose hexahydrophthalate |

Each coating composition was coated and dried on a poly(ethylene terephthalate) film support at a 108 mg/m² dry coverage. The surface resistivity of each layer was measured at 21° C. and 50% relative humidity by the procedure described in ASTM Standard C59.3 noted hereinabove.

The resulting resistivities in ohms/sq. are listed below.

| Control A | $230 \times 10^9$ |
| --- | --- |
| Control B | $109 \times 10^9$ |
| Control C | $179 \times 10^9$ |
| Control D | $359 \times 10^9$ |
| Control E | $152 \times 10^9$ |
| Coating composition of Example 1 | $0.4 \times 10^9$ |

From this resistivity data, it is apparent that the Example 1 coating composition of this invention provides significantly greater conductivity in a coated and dried layer than similar coating compositions which are outside the scope of this invention.

This invention has been described in detail with particular reference to preferred embodiments thereof, but it will be understood that variations and modifications can be effected within the spirit and scope of the invention.

We claim:
1. An aqueous coating composition which is capable of forming a water-insoluble conductive and highly-adherent layer on a support, said coating composition comprising:
   (a) a hydrophilic binder;
   (b) an ester of cellulose having at least 8 acyl groups per $C_{24}$ cellulose unit wherein at least a majority of said acyl groups are derived from an aliphatic polycarboxylic acid having from 3 to 6 carbon atoms; or a salt of said ester; and
   (c) a hardening agent in an amount sufficient to render said composition water-insoluble after coating and drying of said coating composition.
2. The coating composition of claim 1 wherein said ester salt is an alkali metal ester salt.
3. The coating composition of claim 2 wherein said ester salt is a potassium salt.
4. The coating composition of claim 1 wherein at least about two-thirds of said acyl groups are derived from said aliphatic polycarboxylic acid.
5. The coating composition of claim 1 having at least 10 acyl groups per $C_{24}$ cellulose unit.
6. The coating composition of claim 1 wherein said polycarboxylic acid is a dicarboxylic acid.
7. The coating composition of claim 1 wherein said hardening agent is present in an amount of from about 10 to about 30 percent, based on total composition dry weight.
8. A composite base comprising a support having on at least one side thereof, a water-insoluble, conductive and highly-adherent layer composed of:
   (a) a hydrophilic binder;
   (b) an ester of cellulose having at least 8 acyl groups per $C_{24}$ cellulose unit wherein at least a majority of said acyl groups are derived from an aliphatic polycarboxylic acid having from 3 to 6 carbon atoms; or a salt of said ester; and
   (c) a hardening agent in an amount sufficient to render said conductive layer water-insoluble.
9. The composite base of claim 8 having a hydrophobic support.
10. A composite element comprising a support and on at least one side thereof, a hydrophilic layer, said hydrophilic layer being adhered to said support with a water-insoluble, conductive and highly-adherent subbing layer composed of:
   (a) a first hydrophilic binder; and
   (b) an ester of cellulose having at least 8 acyl groups per $C_{24}$ cellulose unit wherein at least a majority of said acyl groups are derived from an aliphatic polycarboxylic acid having from 3 to 6 carbon atoms; or a salt of said ester; and

(c) a hardening agent in an amount sufficient to render said subbing layer water-insoluble.

11. The composite element of claim 10 wherein said hydrophilic layer is formed from a hydrophilic coating composition comprising a second hydrophilic binder and a diffusible hardening agent which is capable of diffusing into said subbing layer and rendering said ester or salt thereof water-insoluble.

12. The composite element of claim 10 having a hydrophobic support.

13. The composite element of claim 12 having a polyester film support.

14. A radiation-sensitive element comprising a support, a radiation-sensitive layer on at least one side of said support, and a water-insoluble, conductive and highly-adherent layer adjacent to said support on at least one side thereof, said conductive layer composed of:
   (a) a hydrophilic binder;
   (b) an ester of cellulose having at least 8 acyl groups per $C_{24}$ cellulose unit wherein at least a majority of said acyl groups are derived from an aliphatic polycarboxylic acid having from 3 to 6 carbon atoms; or a salt of said ester; and
   (c) a hardening agent in an amount sufficient to render said conductive layer water-insoluble.

15. The element of claim 14 wherein said conductive layer is formed from an aqueous coating composition comprising said components (a), (b) and (c).

16. The element of claim 14 wherein said conductive layer is located on a side of said support opposite to that of said radiation-sensitive layer.

17. The element of claim 14 wherein said radiation-sensitive layer is a photographic emulsion layer.

18. The element of claim 14 having a polyester film support.

19. The element of claim 18 having a poly(ethylene terephthalate) film support.

20. The element of claim 14 wherein said conductive layer is a subbing layer adhering said radiation-sensitive layer to said support.

21. The element of claim 14 wherein said conductive layer comprises an alkali metal salt of said ester.

22. The element of claim 14 wherein at least about two-thirds of said acyl groups are derived from said aliphatic polycarboxylic acid.

23. The element of claim 14 wherein said polycarboxylic acid is a dicarboxylic acid.

24. The element of claim 23 wherein said dicarboxylic acid is succinic acid.

25. The element of claim 14 wherein said hardening agent is butanediol diglycidyl ether.

26. The element of claim 14 wherein said water-soluble ester is present in said conductive layer in an amount of from about 50 to about 80 percent, based on total composition dry weight.

27. The element of claim 14 wherein said conductive layer has a surface resistivity less than about $1 \times 10^9$ ohms per square.

28. A photographic element comprising a polyester support and, on at least one side thereof, a photosensitive silver halide emulsion layer, said emulsion layer adhered to said support with a water-insoluble, conductive and highly-adherent subbing layer formed from an aqueous coating composition comprising:
   (a) gelatin;
   (b) potassium cellulose succinate containing at least 10 succinyl groups per $C_{24}$ cellulose unit; and
   (c) butanediol diglycidyl ether in an amount sufficient to render said subbing layer water-insoluble after coating and drying of said coating composition.

29. A photographic element comprising a support and, on at least one side thereof, a photosensitive silver halide emulsion layer which is adhered to said support by a water-insoluble conductive subbing layer, said subbing layer comprising:
   (a) a hydrophilic binder,
   (b) a water-soluble salt of a cellulose ester, said cellulose ester having at least 8 acyl groups per $C_{24}$ cellulose unit wherein at least a majority of said acyl groups are derived from an aliphatic polycarboxylic acid having from 3 to 6 carbon atoms, and
   (c) a hardening agent in an amount sufficient to render said subbing layer water-insoluble.

30. A photographic element comprising a polyester support and, on at least one side thereof, a photosensitive silver halide emulsion layer which is adhered to said support by a water-insoluble conductive subbing layer, said subbing layer comprising:
   (a) a hydrophilic binder,
   (b) a water-soluble salt of a cellulose succinate, said cellulose succinate containing at least 10 succinyl groups per $C_{24}$ cellulose unit, and
   (c) a hardening agent in an amount sufficient to render said subbing layer water-insoluble.

31. A photographic element comprising a poly(ethylene terephthalate) support and, on at least one side thereof, a photosensitive silver halide gelatin emulsion layer which is adhered to said support by a water-insoluble conductive subbing layer, said subbing layer comprising:
   (a) gelatin,
   (b) a water-soluble salt of a cellulose succinate, said cellulose succinate containing at least 10 succinyl groups per $C_{24}$ cellulose unit, and
   (c) a hardening agent in an amount sufficient to render said subbing layer water-insoluble.

32. A photographic element comprising a poly(ethylene terephthalate) support and, on at least one side thereof, a photosensitive silver halide gelatin emulsion layer which is adhered to said support by a water-insoluble conductive subbing layer, said subbing layer comprising:
   (a) gelatin,
   (b) a potassium salt of a cellulose succinate, said cellulose succinate containing at least 10 succinyl groups per $C_{24}$ cellulose unit, and
   (c) butanediol diglycidyl ether in an amount sufficient to render said subbing layer water-insoluble.

* * * * *